United States Patent [19]
Ozone et al.

[11] 3,883,833
[45] May 13, 1975

[54] LINEAR PHASE FILTER WITH DETERMINABLE GAIN CHARACTERISTIC

[75] Inventors: Koho Ozone, Webster; Uno Randmere, Victor, both of N.Y.

[73] Assignee: Stromberg-Carlson Corporation, Rochester, N.Y.

[22] Filed: Jan. 7, 1974

[21] Appl. No.: 431,052

[52] U.S. Cl................ 333/70 R; 333/28 R; 333/29; 333/70 T
[51] Int. Cl............................ H03h 7/10; H03h 7/32
[58] Field of Search............ 333/70 R, 29, 32, 70 T, 333/23, 28 R; 328/155, 163, 167; 323/119, 124

[56] References Cited

UNITED STATES PATENTS

| | | | |
|---|---|---|---|
| 2,273,163 | 2/1974 | Wilson | 333/70 R |
| 2,759,044 | 8/1965 | Oliver | 333/70 T X |
| 2,869,083 | 1/1959 | Indjoudjian | 333/70 R |
| 2,922,965 | 1/1960 | Harrison | 333/28 R |

OTHER PUBLICATIONS

Blackburn – "Components Handbook" McGraw Hill, New York, 1949, TK453B5; pp. 209–217.

*Primary Examiner*—James W. Lawrence
*Assistant Examiner*—Marvin Nussbaum
*Attorney, Agent, or Firm*—Hoffman Stone; William F. Porter, Jr.

[57] ABSTRACT

Amplifiers are added at selected junctions between the reactances of a linear phase LC filter of the kind having an open circuit termination, and the outputs of the amplifiers are added to produce an output signal linear in phase with the input signal, but compensated as desired in respect of its frequency vs. amplitude characteristic. The characteristic is determinable by selecting various different values for the gains of the amplifiers.

1 Claim, 4 Drawing Figures

LINEAR PHASE FILTER WITH DETERMINABLE GAIN CHARACTERISTIC

BRIEF DESCRIPTION

This invention relates to so-called linear phase filters, and, more particularly, to means for correcting the amplitude vs. frequency response of filters of this kind.

Linear phase filters have been mathematically investigated intensively. See, for example, a book, Handbook of Filter Synthesis, by Anatol Zverev, published by John Wiley & Sons, 1967. It is known that, so far as the mathematical analysis is concerned, the amplitude vs. frequency response of linear phase filters can be changed without affecting the phase response by introducing transmission zeros in quadrantal symmetry. The process is called "phase less" correction.

The present invention relates to the discovery that "phase less" correction can be achieved simply by adding amplifiers at selected points along an LC linear phase filter that has an open circuit termination, and summing the outputs of the amplifiers. It is shown that the sum of the outputs of the amplifiers corresponds in form to the expression heretofore derived for "phase less" correction. It is, then, only a straightforward matter of algebra to select the values of the gains of the amplifiers to achieve the degree of correction desired.

As shown in the hereinabove mentioned handbook, the expression for an uncorrected linear phase filter may be expressed as:

$$H_1(S) = \frac{1}{D(S)},$$

where D(S) is a polynominal in the variable S which describes a particular linear phase filter.

When zeros are introduced in quadrantal symmetry, the expression becomes:

$$H(S) \quad \frac{1 + K_2S^2 + K_4S^4 + \ldots + K_NS^N}{D(S)}$$

By choosing various different values for the constants $K_2$, $K_4$, . . . $K_N$, various different amplitude vs. frequency characteristics can be obtained for the expression. The phase shift characteristic, however, is determined only by the polynomial D(S).

An analogous expression is obtained in accordance with the invention by considering the sum of the outputs of amplifiers the inputs of which are connected to junction points between the reactors of a LC linear phase filter, and it is then apparent that "phase less" correction can be achieved in practice merely by selecting the values of the gains of the amplifiers.

DETAILED DESCRIPTION

Representative embodiments of the invention, and the theory on which it is based will now be described in detail in conjunction with the accompanying drawing, wherein.

Figure 1:
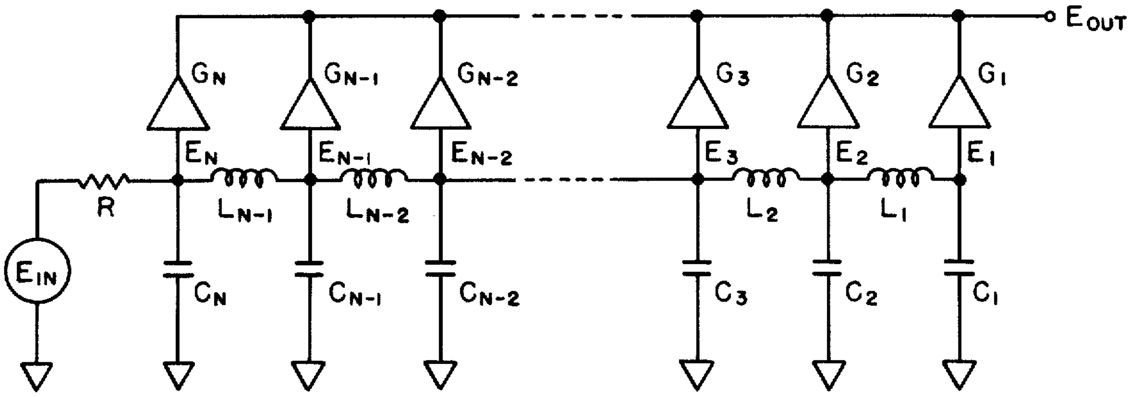
FIG. 1 is a schematic diagram of a "phase less" corrected linear phase filter according to the invention having any desired number of stages.

FIG. 1 illustrates the generalized concept of the invention based on a linear phase filter having N stages, each stage having an inductor L and a capacitor C, and the input stage also having an input capacitor $C_N$ and an input resistor R, the resistor R being connected in series between the input terminal, represented by the voltage $E_N$, of the reactive components of the filter and the source $E_{IN}$ of the signal to be filtered. The junctions of interest are the terminals of the inductors $L_1$,. . .$L_N$, and they are referenced as $E_1$,. . .$E_N$. The filter must be one having a so-called open circuit termination, that is, the shunt resistance across the output capacitor $C_1$ must be high enough to be regarded as infinite for practical purposes. The inputs of the amplifiers $G_1$,. . .$G_N$ are connected respectively to the junctions represented by voltages $E_1$,. . .$E_N$, and the outputs of the amplifiers G are commoned to a single output terminal $E_{OUT}$. The input impedances of all the amplifiers are high so that they do not significantly load the filter.

Now, it will be seen that the voltages across the respective capacitors $C_2$, $C_3$,. . .$C_N$ can all be expressed in terms of the voltage across the output capacitor $C_1$. For example, the voltage across the next to last capacitor $C_2$ may be stated as:

$$E_2 = E_1(1 + S^2L_1C_1).$$

Also:

$$E_3 = E_1[1 + S^2(L_1C_1 + L_2C_2 + L_2C_1) + S^4L_1C_1L_2C_2],$$

and so on. It follows, then, that, $$E_{out} = E_1G_1 + E_1G_2[1 + S^2L_1C_1] + E_1G_3[1 + S^2(L_1C_1 + L_2C_2 + L_2C_1) + S^4L_1C_1L_2C_2] + \ldots$$

and since, $H_1(S) = E_1/E_{IN}$, $$\frac{E_{OUT}}{E_{IN}} = H(S) = H_1(S)\left[G_1 + G_2(1 + S^2L_1C_1) + G_3[\ ] + \ldots\right]$$

Or, collecting terms in S, $$H(S) = \frac{K_0[1 + K_2S^2 + K_4S^4 + \ldots\ldots\ldots].}{D(S)}$$

This last expression corresponds exactly to the expression previously known for the correction achieved by introducing zeros in quadrantal symmetry into the filter mathematics, so it is seen that by selecting the proper amplifiers G the amplitude vs. frequency characteristic of the filter may be varied almost as desired. Actual solution of the equation for the specific characteristic desired in any given case may be complex, but it is straightforward and well within the skill of the mathematician.

Figure 2:
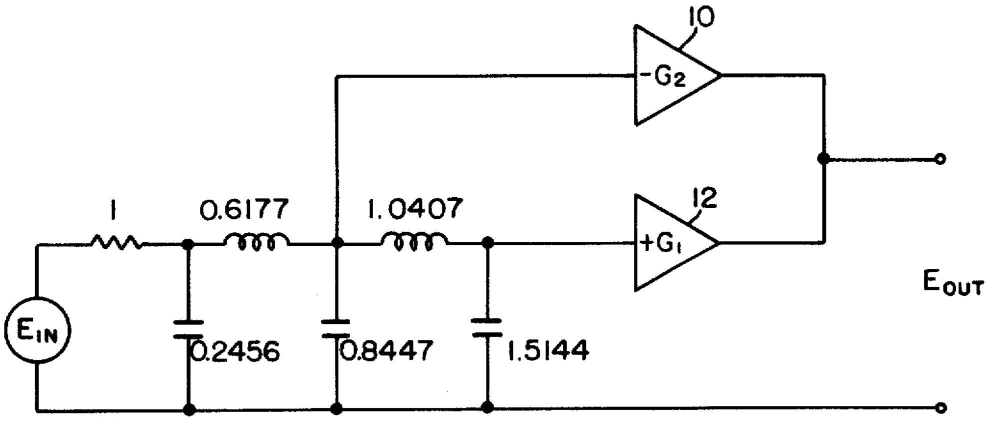
FIG. 2 is a schematic diagram of a filter according to the invention having only two stages.

Because of the many different combinations possible, solutions have so far been worked out only for the relatively simple case illustrated in FIG. 2, which shows a two-stage filter having five reactive components and only two amplifiers. The values of $G_3$,. . .$G_N$ are assumed to be zero; only $G_1$ and $G_2$ are retained. The expression for H(S) then becomes:

$$H(S) = \frac{(G_1 + G_2)[1 + S^2 \frac{G_2}{G_1 + G_2} L_1C_1]}{D(S)}$$

It is also desired that the correction be smooth, which means there should be no zeros on the J axis, and, accordingly, the ratio $G_2/(G_1 + G_2)$ must be a negative number, which may be designated $-A$, and the expression may then be written:

$$H(S) = \frac{(G_1 + G_2)[1 - S^2AL_1C_1]}{D(S)}$$

The expression may be normalized and simplified by substituting the normalized variable P for the variable S, and defining a constant K in terms of the values of the gains of the two amplifiers:

$$G_2 = \frac{K}{L_{1n} \times C_{1n}}$$

and, $G_1 = 1 + G_2$, where $L_{1n}$ and $C_{1n}$ are normalized values of $L_1$ and $C_1$. The resulting working formula is:

$$\frac{E_{OUT}}{E_{IN}} = \frac{1 - KP^2}{1 + b_1P + b_2P^2 + b_3P^3 + b_4P^4 + b_5P^5}$$

In the filter as shown, for which the immediately foregoing expression is applicable, one of the amplifiers 10 and 12 is connected to the input of the last section, and the other is connected to the output of the last section.

The gain of the first amplifier is designated $G_2$, and that of the second as $G_1$. The denominator of the expression is the normalized expression for the uncorrected filter. When the constant K has a value of zero, the filter is not corrected and it corresponds to the filter described by Zverev in the hereinabove identified handbook as the filter designated $n = 5$ in the graph of page 95 of that book. The values of the components of the circuit indicated in FIG. 2 are the normalized values according to Zverev, listed on page 327.

Figure 3:
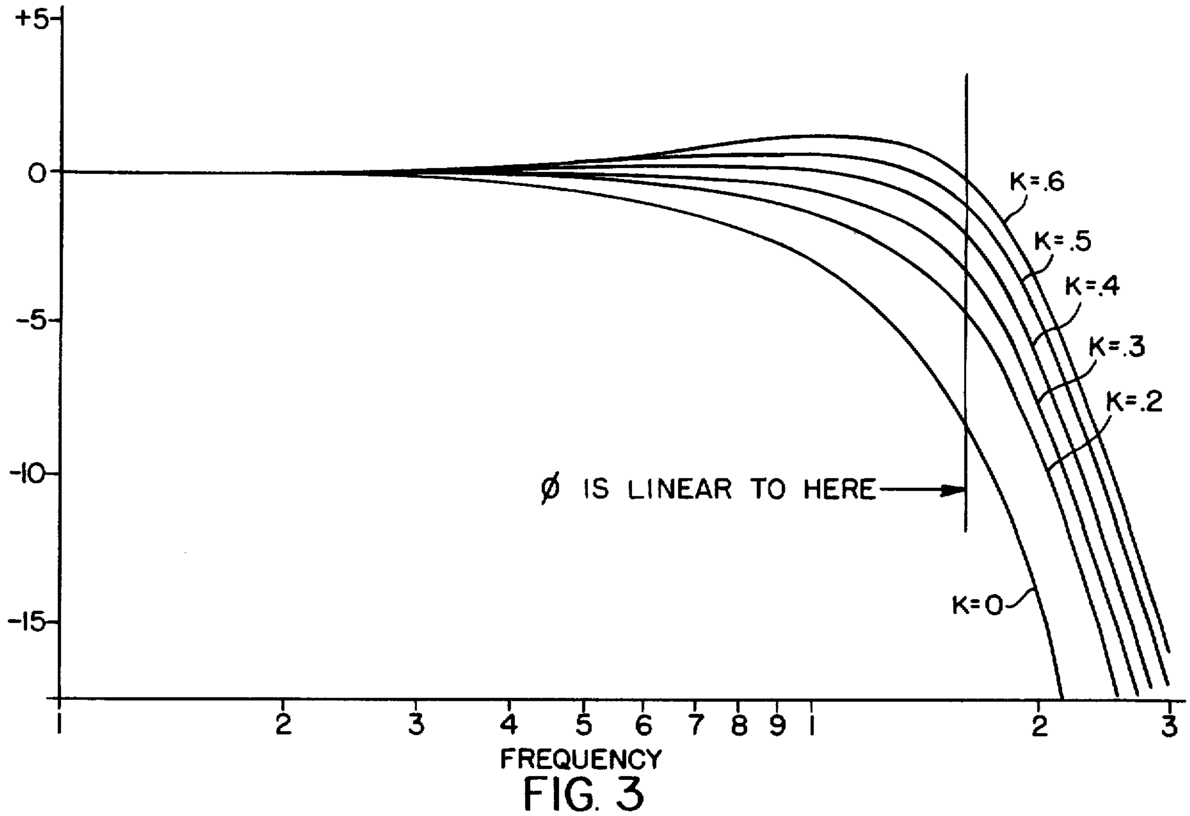
FIGS. 3 and 4 are charts illustrating readily available "phase less" corrections of the filter shown in FIG. 2.
Figure 4:
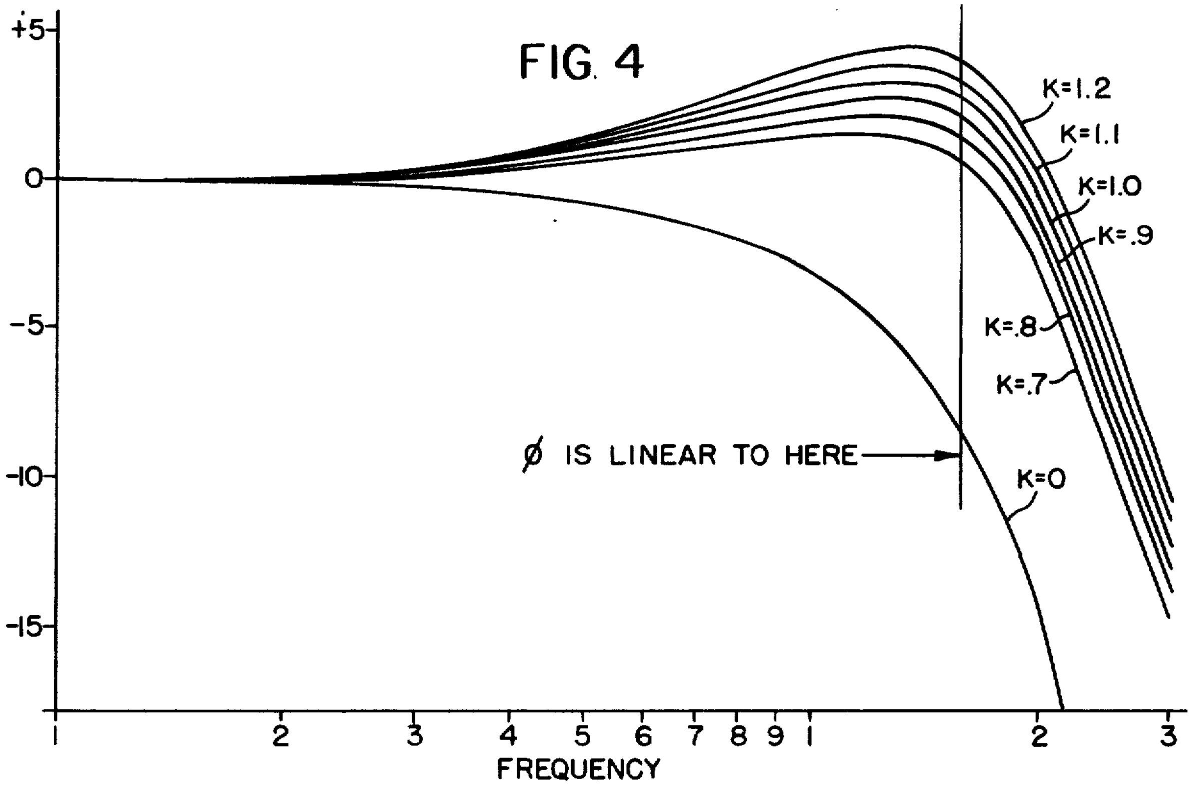

The amplitude vs. frequency response of the filter shown in FIG. 2 is shown graphically in FIGS. 3 and 4 for various different values of K from zero to 1.2. It will be seen that the filter can be corrected to have any of many different responses without affecting the linearity of its phase characteristic.

What is claimed is:

1. A "phase less" corrected linear phase filter comprising a linear phase filter of the LC type having an open circuit termination, amplifiers having high input impedances, the inputs of said amplifiers being connected to selected junctions between the reactive components of the filter, and means connecting the outputs of said amplifiers to a common output terminal so that the signal at the common output terminal represents the sum of the output signals of the amplifiers.

* * * * *